UNITED STATES PATENT OFFICE.

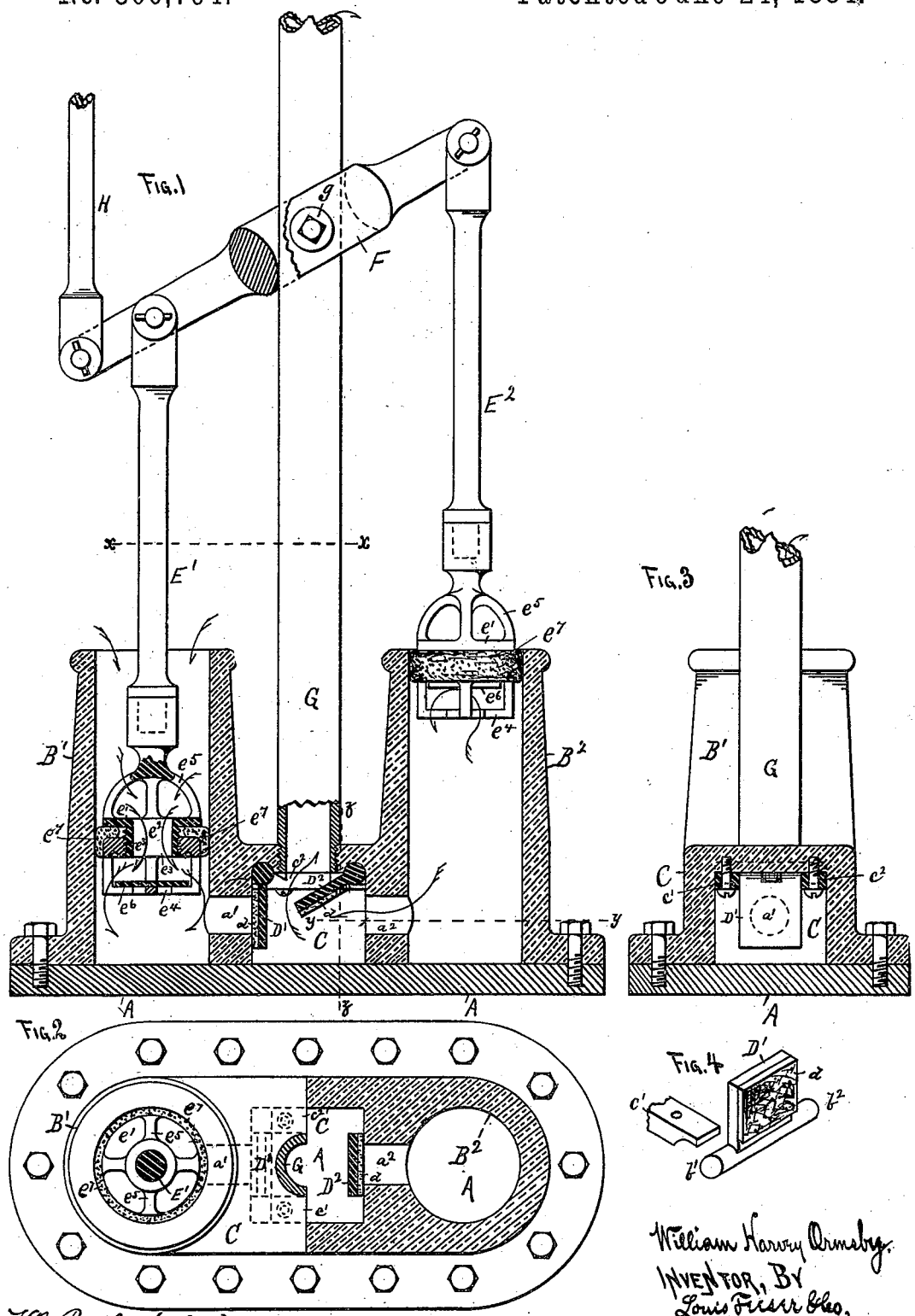

WILLIAM HARVEY ORMSBY, OF MINNEAPOLIS, MINNESOTA, ASSIGNOR OF ONE-HALF TO LORENZO D. HILL AND GEORGE A. HARPER, BOTH OF SAME PLACE.

DOUBLE-ACTING PUMP.

SPECIFICATION forming part of Letters Patent No. 300,794, dated June 24, 1884.

Application filed May 17, 1883. (No model.)

*To all whom it may concern:*

Be it known that I, WILLIAM HARVEY ORMSBY, a citizen of the United States, and a resident of Minneapolis, in the county of Hennepin, in the State of Minnesota, have invented certain new and useful Improvements in Double-Acting Pumps, of which the following specification is a full, clear, and exact description, reference being also had to the accompanying drawings, in which—

Figure 1 is a sectional side elevation. Fig. 2 is a plan view, the right-hand half in section on the line $y\ y$ of Fig. 1, and the left-hand half in section on the line $x\ x$ of Fig. 1. Fig. 3 is a cross-sectional end elevation on the line $z\ z$ of Fig. 1. Fig. 4 is a perspective view of one of the valves detached.

A is a base, upon which two cylinders, $B'$ $B^2$, connected by a chamber, C, are bolted, the cylinders and chamber being cast in one piece, as shown, and submerged in the well or cistern. In the upper outer corners of the chamber C are two semicircular cavities, in which the upper rounded edges of two valves, $D'$ $D^2$, are seated from below before the base A is attached to the cylinders and chamber. The outer edges of these valves are provided with projecting studs $b'$ $b^2$, (see Fig. 4,) beneath which the ends of two clamps, $c'$ $c^2$, are adapted to be held by being screwed to the top of the chamber C. By this means the valves will be securely held in place and left free to open and close to cover or uncover the ports $a'$ $a^2$, which connect the cylinders with the chamber, as shown. Each of the valves $D'$ $D^2$ will be provided with a rubber, leather, or other flexible packing, $d$, to insure water-tight joints between the valves and their seats.

In the top of the chamber C a pipe, G, is screwed, and running upward to the top of the well or cistern in which the pump is submerged, and provided on the upper end with any suitable discharge-nozzle, or provided with a hose or other means of conveying the water to a distance.

The plunger consists of a disk, $e'$, having an open center, $e^2$, and a flange, $e^3$, on the lower side, upon which a valve-cage, $e^4$, is screwed, and provided upon the upper side with an open frame, $e^5$, to which the plunger-rod is attached. Within the cage $e^4$ is a flat valve, $e^6$, and between the disk $e'$ and cage $e^4$ a rubber, leather, or other packing-ring, $e^7$, is held, the whole thus forming a compact strong plunger, valve, and packing easily removable for repairs or the renewal of the valve or packing. Both plungers are alike, and are respectively provided with rods $E'$ $E^2$, connected at their upper ends by a "walking-beam," F, encircling and pivoted at $g$ to the discharge-pipe G a short distance above the pump-cylinders, so that the rods $E'$ $E^2$ are quite short, the actuating-rod H reaching up to the top of the well.

Attached to one end of the walking-beam F is a rod, H, by which the beam may be oscillated upon its pivot $g$.

Small stops may be arranged in the chamber C, against which the valves $D'$ $D^2$ will strike to prevent them opening too far.

By raising and lowering the rod H, the plungers will be alternately raised and lowered to force the water into the chamber C, and up through the pipe G, as indicated by the arrows.

Having described my invention and set forth its merits, what I claim is—

1. A double-cylinder pump constructed with cylinders $B'$ $B^2$, and water-chamber C, communicating therewith, all in one piece, open at the top and bottom, and having a flange around the lower edge, in combination with a flat base, A, bolted thereto, substantially as and for the purpose herein specified.

2. The valves $D'$ $D^2$, provided with projecting journals $b'$ $b^2$, seated in cavities in the inside of the water-chamber C, in combination with clamps $c'$ $c^2$, secured in place in the said water-chamber, substantially as and for the purpose herein specified.

In testimony whereof I have hereunto set my hand in presence of two subscribing witnesses.

WILLIAM HARVEY ORMSBY.

Witnesses:
  C. N. WOODWARD,
  LOUIS FEESER, Sr.